United States Patent
Fuessl et al.

(10) Patent No.: US 8,219,292 B2
(45) Date of Patent: Jul. 10, 2012

(54) METHOD FOR BLOCKING INADMISSIBLE GEAR SHIFTS IN A TRANSMISSION AND SHIFT ASSEMBLY FOR A TRANSMISSION

(75) Inventors: Andreas Fuessl, Kressbronn (DE); Matthias Reisch, Ravensburg (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 170 days.

(21) Appl. No.: 12/864,894

(22) PCT Filed: Feb. 20, 2009

(86) PCT No.: PCT/EP2009/052006
§ 371 (c)(1),
(2), (4) Date: Jul. 28, 2010

(87) PCT Pub. No.: WO2009/112337
PCT Pub. Date: Sep. 17, 2009

(65) Prior Publication Data
US 2010/0324792 A1  Dec. 23, 2010

(30) Foreign Application Priority Data
Mar. 13, 2008 (DE) .................. 10 2008 000 640

(51) Int. Cl.
*G06F 7/00* (2006.01)
(52) U.S. Cl. ............ 701/62; 701/64; 701/94; 701/95; 74/473.11; 74/502.2; 192/3.57; 192/3.58; 475/128; 475/132; 474/80; 440/86
(58) Field of Classification Search .......... 701/62, 701/64, 94, 95; 74/473.11, 502.2, 502.4; 192/3.57, 3.58; 474/80; 475/128, 132; 440/86; 102/215
See application file for complete search history.

(56) References Cited

U.S. PATENT DOCUMENTS

| | | | | |
|---|---|---|---|---|
| 4,380,177 A | * | 4/1983 | Reinecke et al. | 74/473.11 |
| 4,508,190 A | * | 4/1985 | Uchiyama | 180/247 |
| 5,503,039 A | * | 4/1996 | Bailly et al. | 74/335 |
| 5,676,620 A | * | 10/1997 | Ulm et al. | 477/115 |
| 6,109,407 A | * | 8/2000 | Bockmann et al. | 192/3.63 |

(Continued)

FOREIGN PATENT DOCUMENTS

AU          632 234 B2     12/1992

(Continued)

*Primary Examiner* — James P Trammell
*Assistant Examiner* — McDieunel Marc
(74) *Attorney, Agent, or Firm* — Davis & Bujold, P.L.L.C.

(57) ABSTRACT

A method is proposed for blocking inadmissible gearshift processes in a transmission with a plurality of shifting devices which, to carry out a shift process, are moved by actuating devices when a shift command is sent by a control unit (TCU) to the relevant actuating device. The actuating devices are connected for data exchange with one another and with the control unit (TCU) in such manner that the actuating device of the shifting device to be shifted is activated provided that clearance has been given by at least one other actuating device. In addition a shifting system is proposed for a transmission with a control unit and a plurality of actuating devices for the actuation of shifting devices, such that the actuating devices are associated with at least one shaft (A, B) and such that the actuating devices are connected for data exchange with one another and with the control unit (TCU) in such manner that the actuating device of the shifting device to be shifted can be activated provided that clearance has been given by at least one other actuating device.

19 Claims, 3 Drawing Sheets

U.S. PATENT DOCUMENTS

| | | |
|---|---|---|
| 6,575,873 B2 * | 6/2003 | Carl et al. .................. 477/107 |
| 2002/0037790 A1 * | 3/2002 | Carl et al. .................. 477/79 |
| 2003/0047026 A1 | 3/2003 | Hoffmann et al. |
| 2004/0025612 A1 | 2/2004 | Ahnert et al. |

FOREIGN PATENT DOCUMENTS

| | | |
|---|---|---|
| FR | 2 805 587 A1 | 8/2001 |
| WO | 01/88409 A2 | 11/2001 |

* cited by examiner

METHOD FOR BLOCKING INADMISSIBLE GEAR SHIFTS IN A TRANSMISSION AND SHIFT ASSEMBLY FOR A TRANSMISSION

This application is a National Stage completion of PCT/EP2009/052006 filed Feb. 20, 2009, which claims priority from German patent application serial no. 10 2008 000 640.8 filed Mar. 13, 2008.

FIELD OF THE INVENTION

The present invention concerns a method for blocking inadmissible gearshift processes in a transmission. In addition, the invention concerns a shifting system for a transmission with a control unit and a plurality of actuating devices.

BACKGROUND OF THE INVENTION

From automotive technology, automatically shifted transmissions are known. On the one hand there are transmissions in which a shift-under-load element is associated with each gear. Furthermore, there are also transmissions which consist in principle of at least two part-transmissions that can be shifted in parallel, each of which has at least one shift-under-load element and a series of positively-interlocking shifting devices. In any part-transmission that is free from load at the time, gears can be prepared by engaging the shifting devices for the later gearshift process. The shifting devices are actuated with the help of external energy sources, for example hydraulically, electro-mechanically, electromagnetically or pneumatically. A shifting error in the transmission, for example when due to a control error two shifting devices are actuated simultaneously by the actuating devices, which mutually block one another, can result in failure of the transmission or even in a reduction of the driving stability.

In known transmissions with interlock-type shifting devices this is prevented for example by mechanical blocking. However, to produce transmissions which are as compact as possible, it makes sense to position the necessary actuating devices directly in the vicinity of the shifting devices to be shifted. But if each shifting device comprises an isolated actuating device, the mechanical blocking required is very elaborate and therefore occupies considerable space and is cost-intensive. And for example, in a transmission in which the actuating devices are arranged in the form of electric motors in the transmission shafts, no mechanical blocking is possible.

SUMMARY OF THE INVENTION

Accordingly, the purpose of the present invention is to propose a method and a shifting system of the type described at the start, by means of which inadmissible gearshift processes can be blocked inexpensively and reliably without mechanical blocking devices.

Accordingly, a method is proposed for blocking inadmissible gearshift processes in a transmission with a plurality of shifting devices, which are moved by actuating devices to carry out a shift process when a shift command is issued to the actuating device concerned by a control unit, and the actuating devices are connected for data exchange with one another and with the control unit in such manner that the actuating device of the shifting device to be shifted is controlled as a function of clearance received from at least one other actuating device.

With the method proposed according to the invention it can be ensured that in all cases only one actuating device associated with a common transmission or part-transmission, and the shifting device connected to it, is actuated by the control unit. Thus, shift errors and the associated losses of comfort and stability can be reliably avoided. Accordingly, by virtue of the proposed electronic blocking of inadmissible shifting processes, the otherwise necessary mechanical blocking is replaced and thereby not only manufacturing costs but also structural space can be saved.

In a possible embodiment variant of the invention it can be provided that information concerning the local status of the respective other actuating devices is transmitted to the local control system of each actuating device, so that mutual monitoring of the status of the actuating devices is carried out. Thanks to the mutual monitoring between the actuating devices erroneous shifts can be avoided entirely. As the status information concerned, all the information required for monitoring can be exchanged. For example this status information can be obtained from a Hall sensor, an angle indicator, a linear sensor or suchlike, and transmitted. Preferably the status information can be transmitted, for example, by the transmission control unit or suchlike.

For example, in the course of the proposed method, by the local control of each actuating device a nominal position specified by the transmission control unit can be actively regulated, such that by virtue of the local control in the respective other actuating device the clearance is cancelled when it is detected that the associated shifting device has moved outside a permitted position range. For example, all or even only some of the local controls or controllers know, for example, permitted combinations of shift processes and the status of the respective other controllers. it is conceivable that all, or even only some of the nominal and actual positions or the admissible tolerance bands are exchanged between them. the clearance can be cancelled by cutting off the energy supply to the local controller of the active actuating device. However, other procedures for cancelling the clearance are also conceivable.

According to another design of the invention, it can be provided that the clearance is cancelled by the control unit or suchlike when the control unit detects that the associated shifting device has moved outside a permissible position range.

A related possible variant of the invention can provide that the permissible position range or suchlike for local control of each actuating device is specified by the control unit. In this way too, the departure from the permissible position range can be monitored.

In a further embodiment variant of the present invention, it can be provided that a shift command issued to a local control of an actuating device is also transmitted to the local controls of all the inactive actuating devices, so that when an admissible shift command is recognized a corresponding clearance signal is sent by the local controls of the inactive actuating devices to the local control of the active actuating device. This provides a simplified monitoring strategy. In such a case the inactive actuating devices, i.e. those not involved in any shift process, must for example authorize the energy supply to the active actuating device for implementing the shift command.

When the method proposed according to the invention is used in a dual-clutch transmission with two part-transmissions, in which the actuating devices for one part-transmission are arranged in different shafts, it can be provided that the actuating devices of one shaft monitor each other reciprocally. This ensures that in a part-transmission no further shifting device is additionally acknowledged. So in a dual-clutch transmission as well, by virtue of the safety concept according to the invention the respective status information can be reciprocally exchanged between the respective actuating devices.

Preferably, it can be provided that for the actuating devices of a transmission shaft, i.e. for actuating units associated with different part-transmissions, by means of the local control of the inactive actuating device, the clearance of the active actuating device takes place in the common transmission shaft. For example, in the context of the clearance the power electronics unit of the respective other actuating device can be freely switched in the event of an admissible shift command. Other procedures are also possible.

The objective of the invention is also achieved by a shifting system for a transmission comprising a control unit and a plurality of actuating devices for the actuation of shifting devices, such that the actuating devices are associated with at least one shaft and such that the actuating devices are connected to one another and to the control unit for data exchange in such manner that the activation of the actuating devices of the shifting devices to be shifted can be carried out with clearance being provided from at least one actuating device.

The shifting system proposed according to the invention can be used in any transmission to implement a safety concept in the transmission which, by electronic means, prevents blocking of the transmission due to the actuation of a number of shifting devices.

According to a related design of the invention it can be provided that when used in a dual-clutch transmission, the actuating devices for a part-transmission are arranged in different shafts, the shifting system then being designed such that the actuating devices of one shaft give clearance reciprocally. Preferably, this can be achieved by providing in each case a clearance connection for reciprocal clearance between the actuating devices of a shaft. For example, the clearance connection can in each case connect the local control of one actuating device to the power electronics unit of the other actuating device. Thus, a shift command to an active actuating device can only be implemented when clearance is received from the other, inactive actuating device associated with the shaft common to both. Other connection possibilities are also conceivable.

Preferably, regardless of its various embodiment variants, the invention can be applied or used in a transmission, in particular a dual-clutch transmission, such as that described in a not yet published document DE 10 2006 049 274 by the present applicant, the complete content of which is taken into account, in order to control the actuating devices of the shifting devices provided in at least one countershaft in such manner that shifting errors are avoided.

BRIEF DESCRIPTION OF THE DRAWINGS

Below, the present invention is explained in greater detail with reference to the figures, which show.

DETAILED DESCRIPTION OF THE PREFERRED EMBODIMENTS

Figure 1:
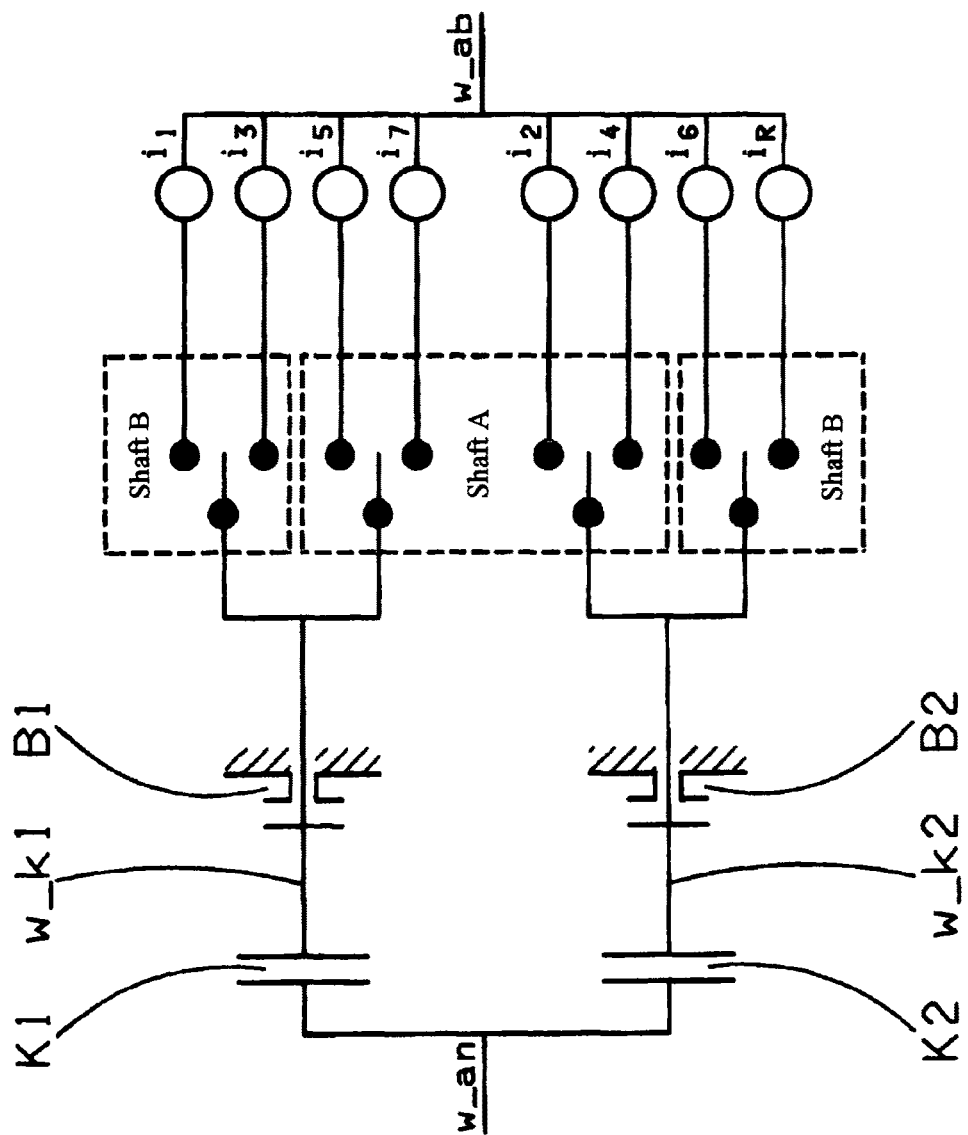
FIG. 1: Schematic view of a dual-clutch transmission shown as an example.

FIG. 1 shows, as an example, a diagram of the mechanical principle of a centrally synchronized dual-clutch transmission. The drive input shaft w_an is coupled via two clutches K1, K2 to a first transmission input shaft w_k1 and a second transmission input shaft w_k2. The first transmission input shaft w_k1 forms the first part-transmission and the second transmission input shaft w_k2 forms the second part-transmission. The fixed wheels of the two transmission input shafts w_k1, w_k2 engage with the loose wheels of a first shaft A (first countershaft) and of a second shaft B (second countershaft). In the example shown, the shiftable loose wheels can produce seven forward-gear transmission ratios $i_1$, $i_2$, $i_3$, $i_4$, $i_5$, $i_6$, $i_7$ and one reverse-gear transmission ratio $i_R$. For this, the loose wheels forming gearwheels for the gears are engaged by shifting devices, which are in turn moved by actuating devices. In the example shown, interlock-type shifting elements such as claw clutches are used as the shifting devices. As actuating devices electro-mechanical actuators are preferably provided, for example with an electric motor which powers a spindle drive that moves the associated shift element. In addition, on each of the shafts A and B a respective transmission brake B1 and B2 is provided, in order to carry out the central synchronization.

In the centrally synchronized dual-clutch transmission, the actuating devices and the associated shifting devices for each respective part-transmission are located in or on different shafts A and B. Since in the example shown each actuating device is associated with a respective dual shifting device which shifts two gear steps, in principle no simultaneous engagement of these two gears on one shaft A, B is possible. However, it is possible that owing to a control error, an additional shifting device of the same part-transmission could be shifted in the respective other shaft A, B. By virtue of the method and the shifting system proposed according to the invention, this is prevented electronically without mechanical means.

Figure 2:
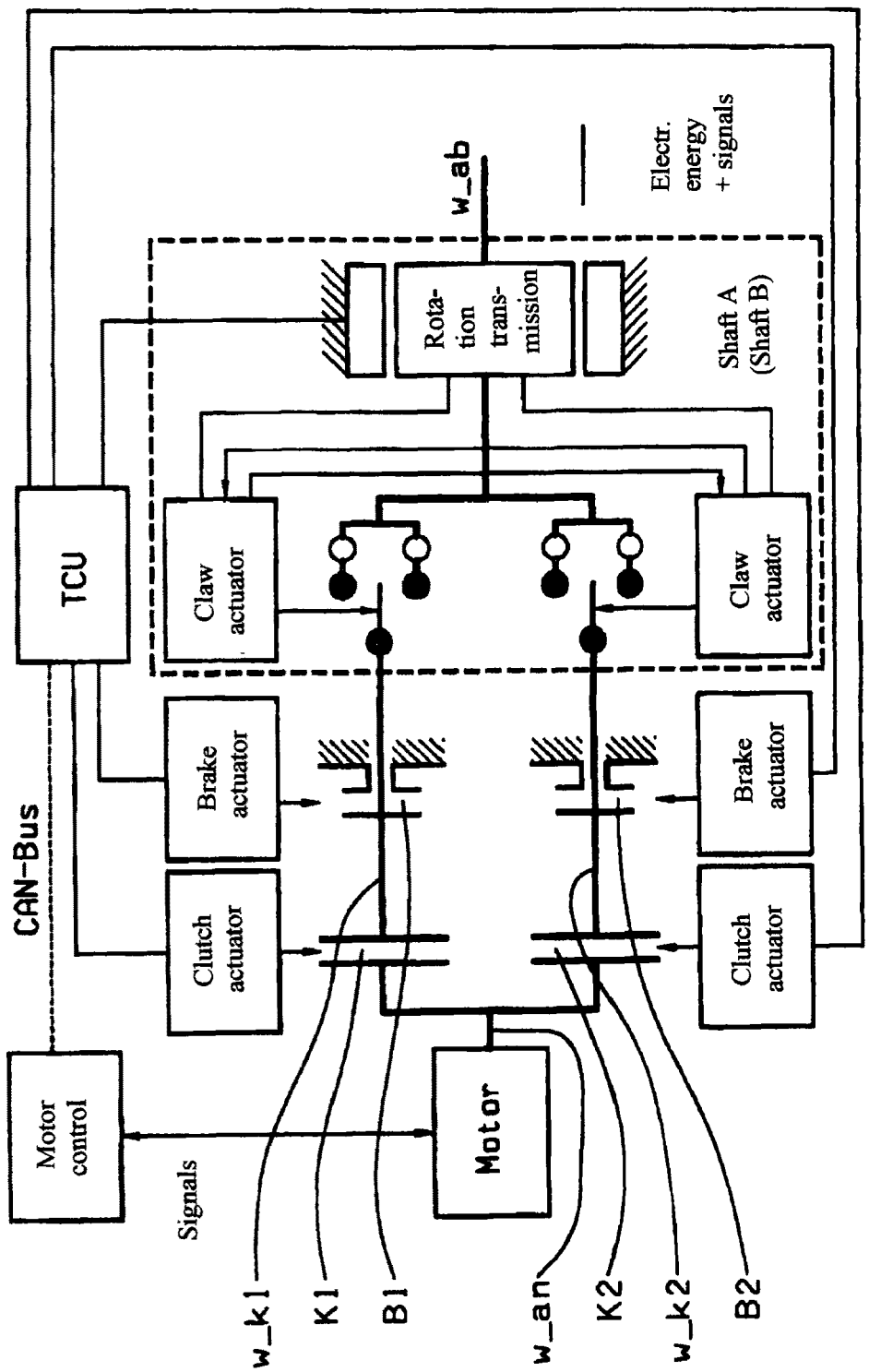
FIG. 2: Schematic view of a possible overall shifting system for the dual-clutch transmission according to FIG. 1.

FIG. 2 shows a system diagram of an overall control unit for the dual-clutch transmission, although the following description relates essentially only to the shifting system according to the invention.

The system diagram shown illustrates, as an example, a possible control concept for the centrally synchronized dual-clutch transmission, this being indicated in the present example only for the shaft A. In particular it is made clear how the actuators for the different transmission branches or part-transmissions are supplied with energy and signals. For example, it is shown that the two shift actuators Claw 1 and Claw 2 can exchange signals via additional signal lines or clearance lines.

A central transmission control unit TCU or central transmission control system supplies, among other things, the actuating devices or shift actuators Claw 1, Claw 2 with actuation energy and actuation signals. In FIG. 2 it is demonstrated, for the shaft A as an example, how the actuating devices and shifting devices for the different part-transmissions are supplied with energy and signals. According to the invention it is provided that the two actuating devices or shift actuators Claw 1, Claw 2 effect their exchanges via additional signal lines. To activate a shifting device or actuating device, the control unit TCU switches on the energy supply for the shift concerned and specifies a nominal position for the actuating device concerned. The local control µC of the respective actuating device Claw 1, Claw 2 interprets the signal and passes the control command on to the electric motor, which sets the designed shift position at the shifting device.

Figure 3:
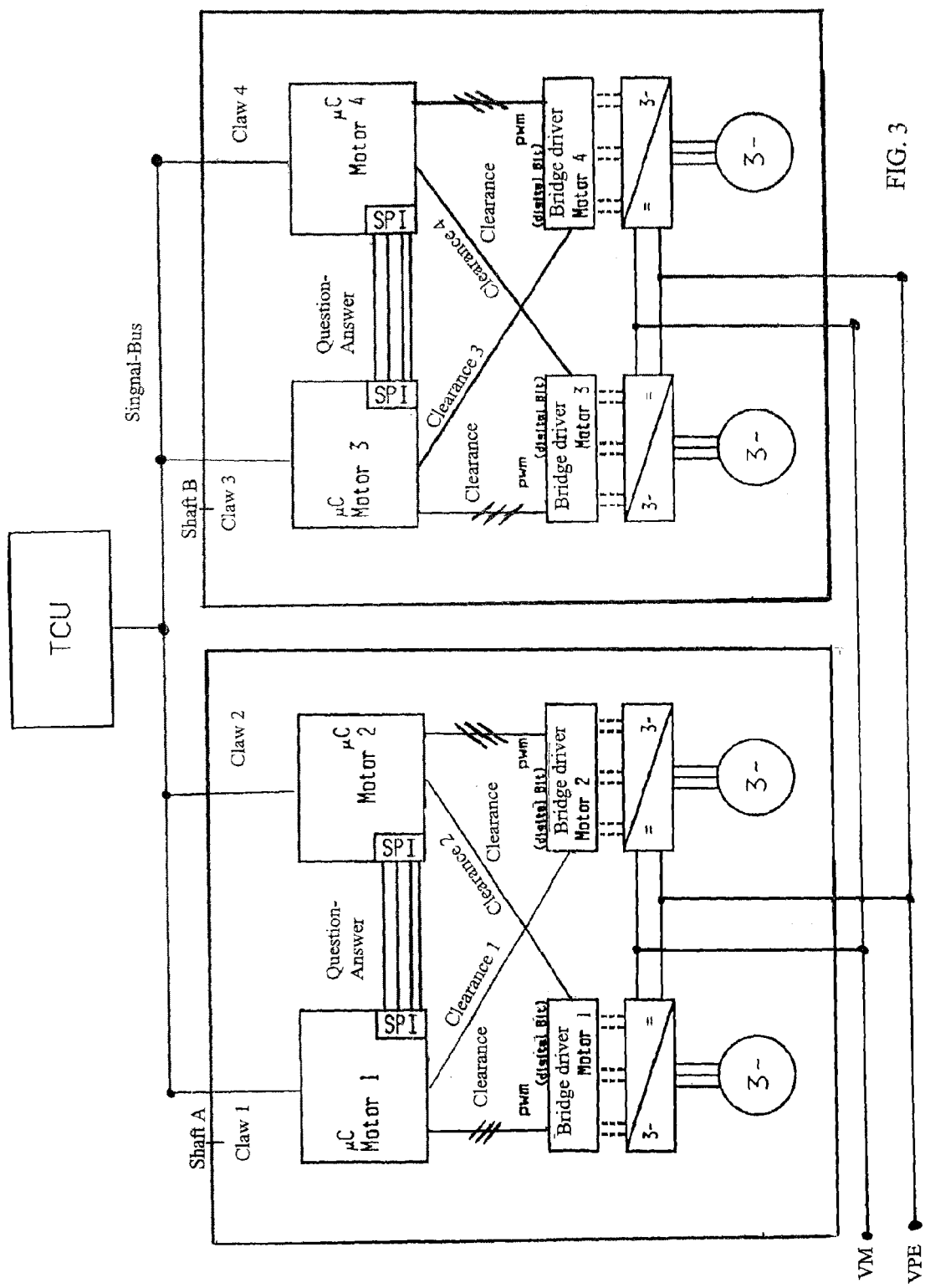
FIG. 3: Schematic view of a possible embodiment variant of a shifting system according to the invention for the dual-clutch transmission.

FIG. 3 shows an example of a possible shifting system for the various actuating devices or shift actuators Claw 1, Claw 2, Claw 3, Claw 4 for blocking inadmissible shift processes in the dual-clutch transmission, such that for example the actuating devices or shift actuators Claw 1, Claw 2; Claw 3, Claw 4 each comprise an electric motor denoted in FIG. 3 as Motor 1, Motor 2, Motor 3, Motor 4, and in each case a spindle drive powered by the electric motor for actuating the associated shifting device. Here, as an example, the electric connections—for example via a signal bus—between the master TCU and the local control units µC of the electric motors, namely Motor 1, Motor 2, Motor 3, Motor 4, of the actuating devices are shown, the devices being for example in the form of internal actuators in the two shafts A and B.

In FIG. 3 the actuating devices or shift actuators are denoted Claw 1, Claw 2, Claw 3 and Claw 4. The two actuating devices Claw 1 and Claw 2 are associated with the shaft A, and the actuating devices Claw 3 and Claw 4 with the shaft B. Claw 1 and Claw 3 are associated with the first part-transmission and Claw 2 and Claw 4 with the second part-transmission.

The control for the power electronic unit of each actuating device or electric motor is denoted as a bridge driver in FIG. 3. The bridge driver controls a bridge circuit with a plurality of transistors. The power electronic units or bridge drivers are connected by a clearance line, in each case denoted as Clearance (digital bit), to the local control unit µC of the respective adjacent actuating device or adjacent shift actuator Claw 1 and Claw 2, or Claw 3 and Claw 4, of a common shaft A or B. Thus, in the case of shaft A, a clearance line Clearance 1 connects the local control unit µC of the Motor 1 of Claw 1 to the bridge driver of the Motor 2 of Claw 2, and another clearance line Clearance 2 connected the local control unit µC of the Motor 2 of Claw 2 to the bridge driver of the Motor 1 of Claw 1. Likewise, in the case of shaft B a clearance line Clearance 3 connects the local control unit µC of the Motor 3 of Claw 3 to the bridge driver of the motor 4 of Claw 4, and another clearance line Clearance 4 connects the local control unit µC of the Motor 4 of the Claw 4 to the bridge driver of the Motor 3 of Claw 3. In addition, via the signal bus all the shift actuators Claw 1, Claw 2, Claw 3, Claw 4 are connected for data and signal exchange with one another and with the control unit TCU. Furthermore, question-answer connection possibilities are provided for data and signal exchange between the local control units µC of the shift actuators Claw 1 and Claw 2, or Claw 3 and Claw 4, of the respective shaft A or B.

To reliably prevent inadmissible shift processes of the two actuating devices or shift actuators Claw 1 and Claw 3, or Claw 2 and Claw 4, in a part-transmission, it is assumed that the current shift positions of the actuating devices are known to the control unit TCU. The actuating devices should not receive simultaneous shift commands via the signal bus from the control unit TCU. Accordingly, in the absence of any shift command all the local control units µC of the actuating devices mutually block one another.

Preferably, electrical energy need only be supplied to the power electronics or bridge driver of the actuating devices to change their shift position. So otherwise, i.e. with no electrical energy supply, the shift position is maintained. For example, this can be done by a holding torque of the motor, by self-locking means, or by blocking the rotation or translation movement by positive-lock or frictional elements.

Thus, with the first locking concept the respective inactive local control unit µC of the actuating device in a shaft A, B can recognize a shift command for the respective active local control unit µC, and can then give clearance to the power electronics or bridge driver of the adjacent, active actuating device. This can be done for example by giving clearance to the electric supply of the power stages or to the power electronics. When the shift command from the master TCU control unit disappears once the shift has been carried out, the control unit of the actuating device is immediately blocked again or the clearances are cancelled.

According to a second possible locking concept it can be provided that the inactive local control units µC of the actuating devices each receive sensor information from the respective other local control unit µC. In addition, the current overall shift status of the transmission as a whole and, after shift processes, the new nominal status, is known to all the local control units µC of the actuating devices. Thus, each local control unit µC of the actuating devices has available the information it needs for monitoring the respective other local control unit µC. With this type of locking concept, the local control units µC of the actuating devices can, for example, actively regulate the nominal position. Only if the permissible position range has been departed from, does the respective other local control unit µC cut off the supply to the faulty local control unit µC or cancel the clearance. In addition, the local control unit µC that has detected an inadmissible deviation informs the master TCU control unit that this has occurred. The sensor information sent to the local control units µC can be, for example, Hall sensor pulses at the shafts of the electric motors or Motor 1, Motor 2, Motor 3 and Motor 4 of the actuating devices, or for example angle indicator signals or linear sensors.

The status of the transmission can for example be described by the current gear, or for example by the current position signals from all the actuating devices or shift actuators Claw 1, Claw 2, Claw 3, Claw 4. The permissible position ranges of the respective local control unit µC of the actuating devices can also be specified by the master TCU control unit instead.

INDEXES w_an Drive input shaft
w_ab Drive output shaft
w_k1 First transmission input shaft
w_k2 Second transmission input shaft
K1 First clutch
K2 Second clutch
B1 Transmission input shaft brake
B2 Transmission input shaft brake
Shaft A First countershaft
Shaft B Second countershaft
$i_1$ First forward gear transmission ratio
$i_2$ Second forward gear transmission ratio
$i_3$ Third forward gear transmission ratio
$i_4$ Fourth forward gear transmission ratio
$i_5$ Fifth forward gear transmission ratio
$i_6$ Sixth forward gear transmission ratio
$i_7$ Seventh forward gear transmission ratio
$i_R$ Reverse gear transmission ratio
µC Local control unit
TCU Transmission control unit
Motor 1 Electric motor of an actuating device
Motor 2 Electric motor of an actuating device
Motor 3 Electric motor of an actuating device
Motor 4 Electric motor of an actuating device
Claw 1 Shift actuator of the first part-transmission
Claw 2 Shift actuator of the second part-transmission
Claw 3 Shift actuator of the first part-transmission
Claw 4 Shift actuator of the second part-transmission

The invention claimed is:
1. A method of blocking an inadmissible gearshift process in a transmission comprising a plurality of shifting devices which are moved by actuating devices in order to carry out a shift process when a shift command is sent to the actuating device concerned via a control unit (TCU), the method comprising the steps of:

connecting the actuating devices to one another and to the control unit (TCU) so as to exchange data such that the actuating device of the shifting device to be shifted is activated provided that clearance has been provided by at least one other actuating device.

2. The method according to claim 1, further comprising the step of transmitting status information concerning local control units (μC) of the other respective actuating devices to a local control unit (μC) of each actuating device in order to carry out reciprocal monitoring of the local control units (μC) of the actuating devices.

3. The method according to claim 2, further comprising the step of transmitting the status information by the control unit (TCU).

4. The method according to claim 2, further comprising the step of obtaining the status information from one of a Hall sensor, an angle indicator and a linear sensor.

5. The method according to claim 4, further comprising the step of canceling the clearance by switching off a power electronics unit of the active actuating device.

6. The method according to claim 2, further comprising the step of actively regulating a nominal position, specified by the control unit (TCU), by the local control unit (μC) of each actuating device, and cancelling clearance given by the local control units (μC) of the other respective actuating devices upon detecting that the associated shifting device departed from a permissible position range.

7. The method according to claim 6, further comprising the step specifying, via the control unit (TCU), the permissible position ranges for the local control unit (μC) of each actuating device.

8. The method according to claim 6, further comprising the step of transmitting, to the control unit (TCU), the information concerning departure from the permissible position range.

9. The method according to claim 2, further comprising the step actively regulating a nominal position specified by the control unit (TCU) by the local control unit (μC) of each actuating device, and cancelling clearance via the control unit (TCU) upon recognizing that the associated shifting device departed from a permissible position range.

10. The method according to claim 9, further comprising the step specifying, via the control unit (TCU), the permissible position ranges for the local control unit (μC) of each actuating device.

11. The method according to claim 9, further comprising the step of transmitting, to the control unit (TCU), the information concerning departure from the permissible position range.

12. The method according to claim 1, further comprising the step transmitting a shift command sent to a local control unit (μC) of an actuating device to the local control unit (μC) of every inactive actuating device so that when an admissible shift command is recognized, a corresponding clearance signal is sent by the local control units of the inactive actuating devices to the local control unit (μC) of the active actuating device.

13. The method according to claim 1, further comprising the step facilitating reciprocal monitoring between the actuating devices (Claw 1, Claw 2; Claw 3, Claw 4) of a shaft (A; B), if the actuating devices for a part-transmission of a dual-clutch transmission are arranged on different shafts (A, B).

14. The method according to claim 13, further comprising the step of giving clearance for the respective other actuating device by the local control unit (μC) of the inactive actuating device for the actuating devices of a shaft (A; B), when a shift command is admissible.

15. A shifting system for a transmission with a control unit and a plurality of actuating devices for actuation of shifting devices, the actuating devices are associated with at least one shaft (A, B), the actuating devices are connected to one another and to the control unit (TCU) for data exchange such that the actuating device of the shifting device to be shifted is activated provided that clearance is given by at least one other actuating device.

16. The shifting system according to claim 15, wherein the transmission is a dual-clutch transmission comprising a part-transmission and the actuating devices for the part-transmission are arranged on different shafts (A, B), and the actuating devices of one shaft (A, B) provide reciprocal clearance to one another.

17. The shifting system according to claim 16, wherein in each case a clearance line (Clearance 1, Clearance 2, Clearance 3, Clearance 4) is provided for the reciprocal provision of clearance between the actuating devices of a shaft (A, B).

18. The shifting system according to claim 17, wherein in each case the local control unit (μC) of an actuating device is connected to a power electronics unit (bridge driver) of the other actuating devices via the clearance line (Clearance 1, Clearance 2, Clearance 3, Clearance 4).

19. A method of blocking an inadmissible gearshift process in a transmission comprising a control unit (TCU), a plurality of actuating devices and a plurality of shifting devices, the method comprising the steps of:

connecting the control unit (TCU), the plurality of actuating devices and the plurality of shifting devices with one another so as to transmit data therebetween;

transmitting a shift command to one of the plurality of actuating devices to facilitate shifting of a respective one of the plurality of shifting devices; and only shifting the respective one of the plurality of shifting devices if the respective one of the plurality of actuating devices to be shifted receives at least one clearance signal from at least one other of the plurality of actuating devices.

* * * * *